United States Patent
Hera, Jr. et al.

(10) Patent No.: US 11,091,710 B2
(45) Date of Patent: Aug. 17, 2021

(54) USE OF SILOXANE POLYMERS FOR VAPOR PRESSURE REDUCTION OF PROCESSED CRUDE OIL

(71) Applicant: ChampionX USA Inc., Sugar land, TX (US)

(72) Inventors: John Hera, Jr., Sugar Land, TX (US); Thomas M. Weathers, Jr., Katy, TX (US); Kimmerly Bruce Peyton, Richmond, TX (US); Christopher John Kasowski, Minot, ND (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 16/183,007

(22) Filed: Nov. 7, 2018

(65) Prior Publication Data
US 2019/0144767 A1    May 16, 2019

Related U.S. Application Data

(60) Provisional application No. 62/584,383, filed on Nov. 10, 2017.

(51) Int. Cl.
*B01D 19/04* (2006.01)
*C10G 71/00* (2006.01)
(Continued)

(52) U.S. Cl.
CPC ......... *C10G 71/00* (2013.01); *B01D 19/0409* (2013.01); *C08L 83/08* (2013.01);
(Continued)

(58) Field of Classification Search
USPC .......................................... 585/510; 508/202
See application file for complete search history.

(56) References Cited

U.S. PATENT DOCUMENTS

| 4,329,528 A | * | 5/1982 | Evans | ............... B01D 19/0409 201/9 |
| 4,824,983 A | | 4/1989 | Fink et al. | |
| 5,435,811 A | * | 7/1995 | Fey | ........................ C10L 1/143 44/320 |

(Continued)

FOREIGN PATENT DOCUMENTS

| EP | 0091257 A2 | 10/1983 |
| WO | 2007/142966 A2 | 12/2007 |

OTHER PUBLICATIONS

James E. Mark, "Overview of Siloxane Polymers," Ch. 1, American Chemical Society, 2000, 10 pages.
International Search Report for International Application No. PCT/US/2018/059605, dated Feb. 14, 2019, 6 pages.

(Continued)

*Primary Examiner* — Philip Y Louie
(74) *Attorney, Agent, or Firm* — Kagan Binder, PLLC

(57) ABSTRACT

Disclosed herein is a method of reducing the vapor pressure of a processed crude oil, wherein such vapor pressure reduction is sufficient to allow safe transportation of the oil. After high-pressure processing for off gassing and subsequent low-pressure separation of water, a processed crude oil may still have sufficient vapor pressure to create hazardous conditions if the oil is transported. This disclosure reports that as little as 10 ppb of certain siloxane polymers applied to such processed crude oils results in treated oils with reduced vapor pressure. Vapor pressure reduction is typically about 1 psi to 10 psi after the application of the disclosed siloxane polymers.

10 Claims, 1 Drawing Sheet

(51) Int. Cl.
*C08L 83/08* (2006.01)
*C10G 31/00* (2006.01)
*C08G 77/24* (2006.01)

(52) U.S. Cl.
CPC ............ *C10G 31/00* (2013.01); *C08G 77/24* (2013.01); *C10G 2300/30* (2013.01); *C10G 2300/80* (2013.01)

(56) References Cited

U.S. PATENT DOCUMENTS

| | | | |
|---|---|---|---|
| 5,853,617 A * | 12/1998 | Gallagher | B01D 19/0404 |
| | | | 516/123 |
| 6,121,602 A | 9/2000 | Poindexter et al. | |
| 6,790,256 B2 | 9/2004 | Means | |
| 9,346,584 B1 * | 5/2016 | Kokojan | B65D 90/12 |
| 2007/0277967 A1 * | 12/2007 | Oserod | B03D 1/1418 |
| | | | 166/75.12 |
| 2008/0142414 A1 | 6/2008 | Gramme et al. | |
| 2013/0048279 A1 | 2/2013 | Appel et al. | |
| 2013/0298456 A1 * | 11/2013 | Udwin | C10G 1/002 |
| | | | 44/589 |
| 2016/0200988 A1 | 7/2016 | Ferrari et al. | |
| 2016/0251582 A1 | 9/2016 | O'Rear et al. | |
| 2018/0059692 A1 * | 3/2018 | Swan | G05D 7/0676 |

OTHER PUBLICATIONS

Written Opinion for International Application No. PCT/US/2018/059605, dated Feb. 14, 2019, 10 pages.

* cited by examiner

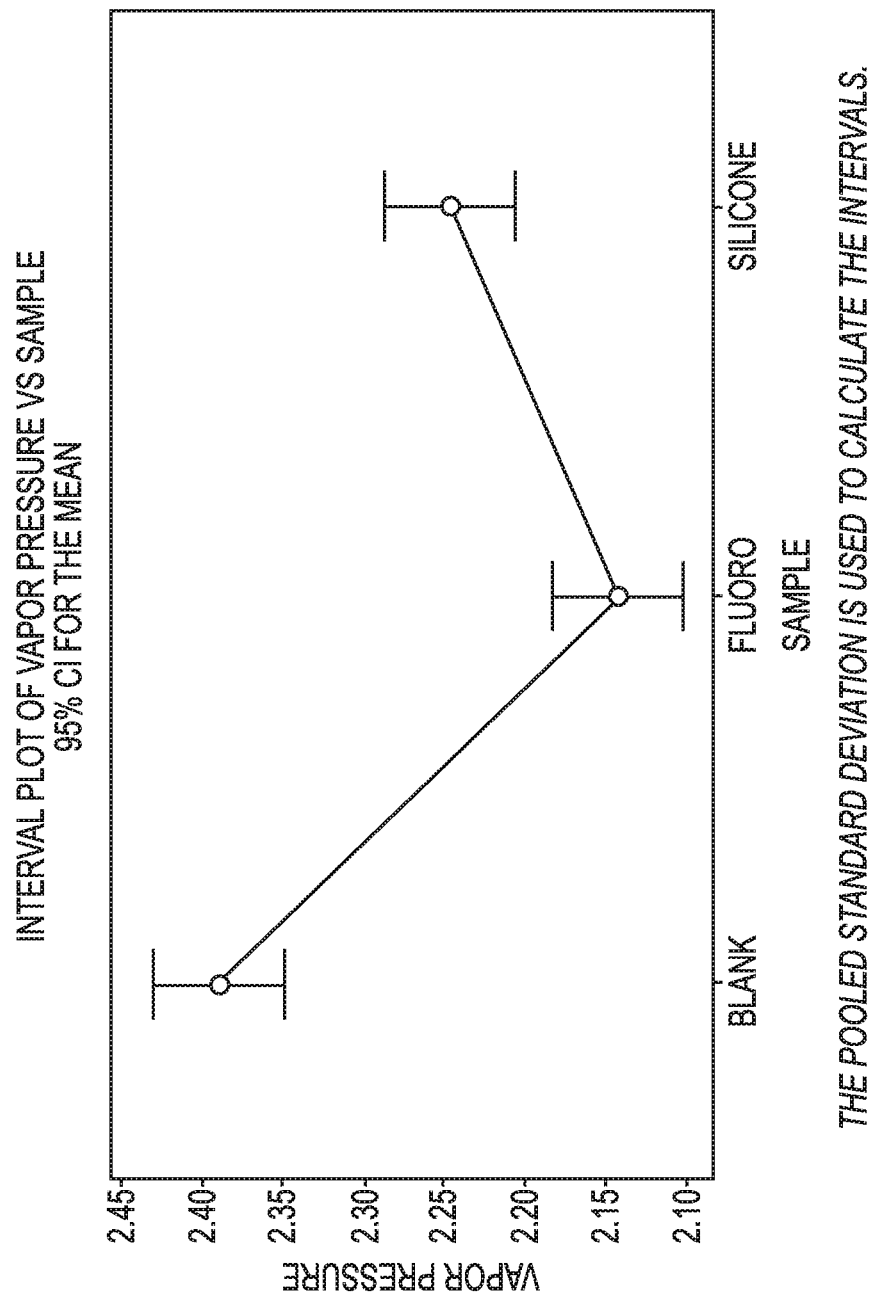

USE OF SILOXANE POLYMERS FOR VAPOR PRESSURE REDUCTION OF PROCESSED CRUDE OIL

BACKGROUND

Unprocessed or untreated crude oil as it is pumped from a well is a mixed composition containing, in part, varying amounts of i) oil (typically a mixture of hydrocarbons), ii) gases (natural gases including, for example, methane, other higher alkane gases and carbon dioxide), and iii) water. Further treatment and processing of the unprocessed or untreated crude oil from the well is needed for downstream applications and transport. This further processing typically includes at least two steps; a gas separation step, and a water separation step.

Separation of entrapped gas from the gas-oil-water composition recovered from the well is generally a high pressure process allowing separation and capture of natural gas and reducing the process pressure associated with gases that were present in the separated oil-water residue. In contrast, separation of the water from the oil is generally a low pressure process, for example less than 250 psia, allowing separation and capture of the treated oil for further downstream processing. For a variety of reasons, the separation of the gas and water from the treated crude oil is not 100% efficient and the processed or treated crude oil will contain varying amounts of residual gas and/or water.

Residual retained gas, for example, may cause downstream problems with the transport of the treated crude oil because of a resulting elevated vapor pressure associated with the residual gas. Elevated vapor pressure may also result from low molecular weight hydrocarbons with physical properties including low boiling point temperatures. These boiling points may be at or near the crude oil processing temperature and elevate the fluid vapor pressure. The elevated vapor pressure must be reduced in order for the treated crude oil to meet established regulatory levels so that it may be transported.

SUMMARY

This disclosure describes a process to reduce vapor pressure of processed crude oil comprising the step of adding a sufficient amount of a siloxane polymer to the processed crude oil after the crude oil is processed in a high pressure gas separation process to provide a treated crude oil, wherein the vapor pressure of the treated crude oil is reduced to facilitate safe transport of the treated crude oil. In embodiments, a process of lowering the vapor pressure of a processed crude oil comprises the following steps in order: processing a crude oil in a high pressure gas separation process to form a processed crude oil; and applying 10 ppb to 10 ppm by volume of a siloxane polymer to the processed crude oil to form a treated oil. The disclosure also describes a treated oil, the treated oil comprising a processed crude oil and 10 ppb to 10 ppm by volume of a siloxane polymer. The treated oil has a reduced vapor pressure compared to the processed crude oil.

BRIEF DESCRIPTION OF THE DRAWING

The FIGURE is a graphical representation of the vapor pressure testing done according to Example 1, below, which demonstrates the ability to reduce vapor pressure of the described crude oil samples.

DETAILED DESCRIPTION

Unprocessed or untreated crude oil typically requires processing before it is suitable for transport and downstream uses. When crude oil from a production well is recovered and treated on site, it is typically pumped to a natural gas recovery or removal separator. This gas separation process is typically a high pressure process.

High pressure treatment of crude oil to form a processed crude oil is generally carried out as follows. From the wellhead, produced fluids first go through a 2 phase separator then a heater treater. An antifoam chemistry is injected continuously into the flowline upstream of the 2 phase separator at a rate of about 0-100 ppm by volume in the crude oil before the crude enters a series of production tanks. The crude oil production tanks are sealed to prevent the release of volatile organic vapor compounds (VOC's). The tanks will also have a pressure relief pop-off valve that releases captured gases from the headspace of the production tanks, sending it to flare, gas sales point, or a gas transmission pipeline. After the gas is removed, the crude oil is transferred from the production tanks either directly to a Lease Area Custody Transfer (LACT) sales point or to a Central Tank Battery (CTB) where crude oil from multiple sites is mixed together and sent to a LACT. The LACT is the specific point where it is tested for vapor pressure. If the vapor pressure meets the safety requirements applicable to the type of processed crude oil for the specific site, the processed crude oil may be transported. Processed crude oil having vapor pressure in excess of the applicable standard cannot be safely transported.

In embodiments, the gas/oil ratio of the processed crude oil is in a range of about 0-100 scf/bbl (standard cubic foot per barrel). In embodiments, processed crude oil vapor pressure is less than about 250 psia (psi-absolute). In embodiments, a processed crude oil excludes or substantially excludes a siloxane polymer.

Before the processed crude oil can be transported, vapor pressure associated with the liquid is measured. In embodiments, the development of vapor pressure in a processed crude oil is associated with entrained (or "carry under") gas within the oil due to inefficiencies with the high pressure gas/oil separators. In embodiments the development of vapor pressure in a processed crude oil is related to the oil composition itself and the lighter range of hydrocarbons that are near their boiling point.

In embodiments, a treated oil comprises, consists essentially of, or consists of a processed crude oil combined with about 10 ppb to 10 ppm of a siloxane polymer (wherein all such recitations related to treated oils herein, unless otherwise specified, refer to vol/vol of the treated oil). As provided in this disclosure, adding a siloxane polymer to a processed crude oil in an amount between 10 ppb (0.010 ppm) and 10 ppm, for example about 100 ppb to 10 ppm, or about 1 ppm to 10 ppm, or about 10 ppb to 1 ppm, or about 10 ppb to 500 ppb will reduce the vapor pressure of the treated crude oil by about 1 psi to 10 psi, for example about 1 psi to 5 psi (1-5 psi), about 1-4 psi, or 1-3 psi, or 1-2 psi, or 2-5 psi, or 2-4 psi, or 2-3 psi, or 3-5 psi, or 3-4 psi compared to the vapor pressure of the processed crude oil. This benefit is realized even if there was no addition of a siloxane polymer upstream (before or contemporaneously with the high-pressure processing).

In embodiments, the siloxane polymer comprises, consists essentially of, or consists of an organosiloxane polymer, or "silicone"; a fluorinated organosiloxane polymer or a copolymer of fluorinated and non-fluorinated organosiloxane, or "fluorosilicone"; or a blend of any two or more silicone or fluorosilicone polymers or copolymers. Other types of silicones that can be effective include silicone alkoxylates and other reacted silicones as well as compounded silicones containing hydrophobic silica. In embodiments, a sufficient amount of the siloxane polymer to reduce the processed crude oil vapor pressure by about 1 psi to 5 psi is in a range of about 10 ppb (0.010 ppm) to 10 ppm as a volume/volume ratio of siloxane polymer to the processed crude oil.

In embodiments, suitable siloxane polymers include organosiloxane polymers and mixtures thereof, collectively "silicone polymers", having a general structure of Formula 1:

  Formula 1 wherein each $R^1$ and each $R^2$ are independently selected from organic groups including but not limited to alkyl, aryl, alkaryl, and heterocyclic groups; and n is an integer ranging from 10 to $1 \times 10^5$, for example 100 to $1 \times 10^4$. In embodiments, all $R^2$ are methyl. In embodiments, all $R^1$ are methyl. In embodiments, all $R^1$ and all $R^2$ are methyl. In embodiments, the silicone polymer is a copolymer or a mixture of two or more such species.

Suitable fluorosilicone polymers include compounds having a general structure of Formula 2:

  Formula 2 wherein each $R^1$ is independently selected from alkyl, aryl, alkaryl, and heterocyclic groups, and $R^3$ is a fluorinated organic group having one or more fluorine atoms and comprising, for example, such as fluorinated alkyl, fluorinated aryl, fluorinated alkaryl and fluorinated heterocyclic groups, wherein each representative group comprises one or more fluorine atoms, and n is an integer ranging from 10 to $1 \times 10^5$, for example 100 to $1 \times 10^4$. One non-limiting example of a suitable fluorosilicone is a copolymer of dimethylsiloxane and trifluoropropyl methyl siloxane. These copolymers are compounds have the general structure of Formula 3:

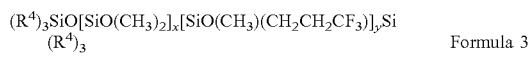  Formula 3 wherein each $R^4$ is independently selected from hydroxyl, alkyl, aryl, alkaryl, and heterocyclic groups and fluorinated organic groups having one or more fluorine atoms and comprising, for example, fluorinated alkyl, fluorinated aryl, fluorinated alkaryl and fluorinated heterocyclic groups; and x and y are integers ranging from 10 to $1 \times 10^5$, for example 100 to $1 \times 10^4$.

In embodiments, the compositions and methods comprise or consist essentially of one or more compounds according to Formula 1, and exclude or substantially exclude compounds according to Formula 2. In embodiments, the compositions and methods comprise or consist essentially of one or more compounds according to Formula 1, and exclude or substantially exclude compounds according to Formula 3. In embodiments, the compositions and methods comprise or consist essentially of one or more compounds according to Formula 1, and exclude or substantially exclude compounds according to Formula 2 or Formula 3. In embodiments, the compositions and methods comprise or consist essentially of one or more compounds according to Formula 2, and exclude or substantially exclude compounds according to Formula 1. In embodiments, the compositions and methods comprise or consist essentially of one or more compounds according to Formula 2, and exclude or substantially exclude compounds according to Formula 3. In embodiments, the compositions and methods comprise or consist essentially of one or more compounds according to Formula 2, and exclude or substantially exclude compounds according to Formula 1 or Formula 3. In embodiments, the compositions and methods comprise or consist essentially of one or more compounds according to Formula 3, and exclude or substantially exclude compounds according to Formula 1. In embodiments, the compositions and methods comprise or consist essentially of one or more compounds according to Formula 3, and exclude or substantially exclude compounds according to Formula 2. In embodiments, the compositions and methods comprise or consist essentially of one or more compounds according to Formula 3, and exclude or substantially exclude compounds according to Formula 1 or Formula 2.

In embodiments, one or more compounds according to Formula 1 are combined with either one or more compounds according to Formula 2, one or more compounds of Formula 3, or a blend thereof at a weight ratio of polymers of Formula 1:(Formula 2+Formula 3) of about $1 \times 10^8$:1 to 1:1 to provide as siloxane ratio suitable for applying to one or more produced crude oils to form treated oil. In embodiments, the weight ratio of polymers of Formula 1:(Formula 2+Formula 3) is about $1 \times 10^7$:1 to 1:1, or about $1 \times 10^6$:1 to 1:1, or about $1 \times 10^5$:1 to 1:1, or about $1 \times 10^4$:1 to 1:1, or about $1 \times 10^3$:1 to 1:1, or about 100:1 to 1:1, or about 10:1 to 1:1. The combining of silicone and fluorosilicone polymers at the selected ratio may be suitably accomplished before, after, or contemporaneously with applying the siloxane polymers to the processed crude oil to form the treated oil.

Mixtures of two or more siloxanes, such as one or more compounds of Formula 1, one or more compounds of Formula 2, and/or one or more compounds of Formula 3 are suitably combined neat, or in a solvent as a siloxane concentrate. The siloxane mixtures and concentrates of the mixtures are suitably applied to one or more processed crude oils, wherein 10 ppb to 10 ppm by volume of total siloxane is applied to the processed crude oil to obtain a treated oil, and the treated oil includes a vapor pressure that is 1 psi to 5 psi lower than that vapor pressure of the processed crude oil, for example 2 psi to 3 psi lower.

In Formulas 1, 2, and 3 representative organic groups $R^1$, $R^2$, $R^3$, and $R^4$ may include, for example, dimethyl, methyl phenyl, ethyl butyl, methyl cyclohexyl, dicyclohexyl, diphenyl, hydroxy phenyl methyl, phenyl propyl, phenyl isopropyl, tolyl butyl, tolyl amyl, phenyl hydroxy ethyl or the related fluorinated derivatives. In addition, the terminal $R^1$ groups and backbone $R^2$, $R^3$, $R^4$ or $OR^5$ groups may optionally be substituted by hydroxyl groups.

Representative siloxane polymers and concentrates include polydimethylsiloxane "fluids" having molecular weights commensurate with kinematic viscosity at 25° C. of about 5000 cSt to 500,000 cSt, for example about 10,000 cSt to 100,000 cSt, or about 10,000 cSt to 70,000 cSt. The polydimethylsiloxane is provided in an aromatic solvent including about 15 wt % to 25 wt % polydimethylsiloxane.

Representative siloxane polymers and concentrates include fluorosilicone "fluids" having molecular weights commensurate with kinematic viscosity at 25° C. of about 100 cSt to 20,000 cSt, for example about 1000 cSt to 10,000 cSt, or about 1000 cSt to 8,000 cSt.

The vapor pressure of a processed crude oil is reduced after applying the siloxane polymer in an amount of about 10 ppb to 10 ppm vol/vol; in embodiments, the vapor pressure is reduced by about 1 psi to 5 psi, for example about 2-3 psi. In embodiments the vapor pressure of the processed crude oil is less than about 250, 225, 200, 175, 150, 125, 100, 75, 50, or 25 psia. In embodiments, the gas/oil ratio of the treated oil is less than about 100, 90, 80, 70, 60, 50, 40, 30, 20, or 10 scf/bbl.

In embodiments, the siloxane polymer is supplied as a concentrate. The siloxane polymer concentrate comprises, consists essentially of, or consists of the siloxane combined or mixed with a solvent. Such mixtures have lower viscosity than the "neat" polymer and are pumpable or pourable, and therefore provide ease of applying a siloxane polymer to a processed crude oil. Such compositions may be referred to herein as "concentrates" or "siloxane concentrates". Suitable solvents for silicone concentrates include, for example, aliphatic or aromatic hydrocarbon solvents and mixture thereof such as kerosene, HAN, and the like. Suitable solvents for fluorosilicones include, for example, methyl isobutyl ketone, isooctyl acetate solvent, oxygenated solvents, and mixtures of these.

In embodiments, the concentrate comprises, consists essentially of, or consists of a solvent and about 1 wt % to 50 wt % siloxane polymer. In embodiments, a siloxane concentrate comprises, consists essentially of, or consists of a solvent and a silicone polymer, wherein the silicone polymer concentration is about 5 wt % to 50 wt % of the siloxane concentrate, for example about 10 wt % to 50 wt %, or about 10 wt % to 40 wt %, or about 15 wt % to 40 wt %, or about 15 wt % to 30 wt %, or about 20 wt % to 30 wt % of the siloxane concentrate. In embodiments, a siloxane concentrate comprises, consists essentially of, or consists of a solvent and a fluorosilicone polymer, wherein the fluorosilicone polymer concentration is about 1 wt % to 10 wt % of the siloxane concentrate, for example about 2 wt % to 10 wt %, or about 2 wt % to 8 wt %, or about 3 wt % to 8 wt %, or about 3 wt % to 7 wt %, or about 4 wt % to 7 wt %, or about 4 wt % to 6 wt % of the siloxane concentrate.

The siloxane concentrate or neat siloxane polymer is applied to a processed crude oil in a batch-wise or continuous process. Applying is suitably accomplished by dripping, spraying, pumping, pouring, or injecting a siloxane concentrate. The siloxane polymer may be added to the processed crude oil at a variety of places in one or more crude oil process streams. Preferably the siloxane is applied to the processed crude oil after or contemporaneously with pumping of the processed crude oil to one or more holding tanks or to a custody transfer unit.

This disclosure describes a process to reduce the vapor pressure of a treated crude oil in order for it to meet regulatory standards before the treated crude oil may be transported. The described process comprises adding a silicone-based or fluorosilicone-based polymer to the treated crude oil.

This disclosure describes chemistries that may be useful in reducing vapor pressure on crude oils. Generally, antifoams and defoamers not only break surface foam, but may also minimize gas in the crude oil. The effectiveness of antifoams to minimize gas entrainment has been reported in U.S. Pat. No. 6,121,602 (assigned to Nalco Company LLC). Application of antifoams to reduce vapor pressure to crude oil, that did not require adding antifoam to control foaming, has not previously been reported.

Bench testing, as set out in the Examples below, measured the effectiveness of siloxane polymers to reduce vapor pressure in processed crude oils. The Examples set out below also demonstrate the benefit of this processing technology. Direct application of the siloxane polymer in the field demonstrate that the polymers disclosed herein reduced the vapor pressure in processed crude oil in an amount sufficient to provide for safe transportation thereof.

EXPERIMENTAL

Example 1

A processed crude oil was mixed with 10 ppm by volume of a silicone fluid (polydimethylsiloxane, or PDMS, 12,500 cSt, in aromatic solvent) and vapor pressure measured before and after the addition using ASTM D6378 (method on a ERALYTICS ERAVAP vapor pressure tester). Similarly, the same processed crude oil was mixed with 2 ppm by volume of a fluorosilicone (EC9357A fluorosilicone in ketone solvent, obtained from Nalco Champion of Naperville, Ill.) and vapor pressure measured before and after the addition.

The results of the vapor pressure testing demonstrate the ability to reduce vapor pressure of a processed crude oil sample. In The FIGURE and the table below, "fluoro" and "EC9357A" respectively refer to the fluorosilicone; and "silicone" and "EC9017A" both refer to the PDMS as those materials are employed in this Example 1.

Additional bench testing was performed on Permian crude oil (40 API°) and the results indicated that both silicone and fluorosilicone chemistries were able to reduce the vapor pressure.

| Products | RVPE* (psia) | % Reduction | Product | Ave. | Ranking |
|---|---|---|---|---|---|
| Product Ranking | | | | | |
| | | | Crossbar Ranch Sample 1 | | |
| Crossbar Ranch 1 | 8.52 | 100% | EC9357A | 25.10% | 1st |
| EC9017A (05 ppm) | 8.59 | 0.00% | V-116 | 11.74% | 2nd |
| EC9017A (10 ppm) | 7.78 | 8.68% | | | |
| EC9017A (20 ppm) | 8.15 | 4.34% | | | |
| EC9357A (05 ppm) | 6.04 | 29.11% | | | |
| EC9357A (10 ppm) | 6.46 | 24.20% | | | |
| EC9357A (20 ppm) | 6.65 | 22.00% | | | |
| V-116 (05 ppm) | 7.11 | 16.55% | | | |
| V-116 (10 ppm) | 7.51 | 11.85% | | | |
| V-116 (20 ppm) | 7.94 | 6.81% | | | |
| | | | Crossbar Ranch Sample 2 | | |
| Crossbar Ranch 2 | 5.12 | 100% | EC9357A | 8.72% | 1st |
| EC9017A (05 ppm) | 5.26 | 0.00% | V-116 | 7.00% | 2nd |
| EC9017A (10 ppm) | 5.79 | 0.00% | | | |
| EC9017A (20 ppm) | 6.33 | 0.00% | | | |
| EC9357A (05 ppm) | 5 | 2.34% | | | |
| EC9357A (10 ppm) | 3.94 | 23.05% | | | |
| EC9357A (20 ppm) | 5.08 | 0.78% | | | |
| V-116 (05 ppm) | 5.29 | 0.00% | | | |
| V-116 (10 ppm) | 5.89 | 0.00% | | | |
| V-116 (20 ppm) | 4.08 | 20.31% | | | |

Example 2

Crude oil from the Permian Basin was tested in a field trial. A 12500 cSt polydimethylsiloxane fluid (PDMS) in an aromatic solvent was successful at reducing the crude oil vapor pressure by 2-3 psi on average during the field trial. A summary of the system flow for processing crude oil is as follows:

From the wellhead, produced fluids go through a 2 phase separator first then a heater treater. An antifoam is injected continuously into the treater oil dump at a rate of about 50-100 ppm by volume in the crude oil before the crude enters a series of holding tanks. One or more vapor recovery units capture gas off the vapor space of the production tanks. The processed crude oil is pipelined to holding tanks, where it is tested for vapor pressure. If the vapor pressure meets the safety requirements applicable to the type of processed crude oil for the specific site (<12.7 psi for Bakken, <9 psi Permian), the processed crude is shipped. Processed crude oil having vapor pressure in excess of the applicable standard cannot be safely transported.

The PDMS applied to the processed crude oil at about 10 ppb to 10 ppm reduces vapor pressure by an average of 2-3 psi, which is unexpected at least because effective treatment range is 10 ppm or less, whereas the treatment ranges for antifoaming activity of silicone polymers are typically 50-100 ppm.

What is claimed:

1. A process to reduce a vapor pressure of processed crude oil, the process comprising:
processing a crude oil containing an antifoam in gas separation and water separation processes to provide a processed crude oil;
transferring the processed crude oil to holding tanks; and
applying 10 ppb to 500 ppb by volume of siloxane processed crude oil to form a treated oil having a vapor pressure of about 1 psi to 10 psi less than a vapor pressure of the processed crude oil.

2. The process of claim 1, wherein the siloxane polymers is a mixture of a silicone polymer and a fluorosilicone polymer.

3. The process of claim 1, wherein the siloxane polymers comprises polydimethylsiloxane.

4. The process of claim 1, wherein the siloxane polymers excludes fluorosilicone polymer.

5. The process of claim 1, wherein the applying the siloxane polymers is accomplished by applying a mixture of the siloxane polymers in solvents, wherein the amount of the siloxane polymers in the solvents is from 0.01 to less than 100 wt %.

6. The process of claim 5, wherein the solvents are selected from kerosene, an aliphatic solvent, or an aromatic solvent.

7. The process of claim 5, wherein the solvents are methyl isobutyl ketone, iso-octyl acetate solvent, or an oxygenated solvent.

8. The process of claim 1, wherein a gas/oil ratio of the treated oil is in a range of about 0-100 scf/bbl.

9. The process of claim 1, wherein the vapor pressure of the treated oil is less than about 250 psia.

10. The process of claim 1, wherein the holding tanks comprises a lease area custody transfer sales point, a central tank battery, or a custody transfer unit.

* * * * *